United States Patent
Horiuchi et al.

(10) Patent No.: US 10,168,893 B2
(45) Date of Patent: Jan. 1, 2019

(54) IDENTIFYING INPUT INTERRUPTION

(71) Applicant: International Business Machines Corporation, Armonk, NY (US)

(72) Inventors: Yoshio Horiuchi, Hiratsuka (JP); Takaaki Kawase, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 14/955,177

(22) Filed: Dec. 1, 2015

(65) Prior Publication Data

US 2017/0153794 A1   Jun. 1, 2017

(51) Int. Cl.
| | |
|---|---|
| G06F 3/0481 | (2013.01) |
| G06F 3/0488 | (2013.01) |
| G06F 3/0485 | (2013.01) |
| G06F 3/0482 | (2013.01) |

(52) U.S. Cl.
CPC ......... *G06F 3/0488* (2013.01); *G06F 3/0482* (2013.01); *G06F 3/0485* (2013.01); *G06F 3/04812* (2013.01)

(58) Field of Classification Search
CPC ......... G06F 3/00; G06F 3/048; G06F 3/0481; G06F 3/0482; G06F 3/0484; G06F 3/0485; G06F 3/0488
See application file for complete search history.

(56) References Cited

U.S. PATENT DOCUMENTS

| | | | |
|---|---|---|---|
| 5,694,150 A * | 12/1997 | Sigona | G06F 3/038 715/856 |
| 6,005,575 A * | 12/1999 | Colleran | G06F 9/4443 715/807 |
| 6,720,982 B1 | 4/2004 | Sakaguchi | |
| 6,831,631 B2 | 12/2004 | Chuang | |
| 7,295,191 B2 | 11/2007 | Kraus et al. | |
| 7,707,509 B2 * | 4/2010 | Naono | G06F 9/4446 715/764 |
| 8,078,560 B2 * | 12/2011 | Takata | G06F 9/4446 706/45 |

(Continued)

FOREIGN PATENT DOCUMENTS

| | | |
|---|---|---|
| JP | 2000163186 A | 6/2000 |
| JP | 2011511332 A | 4/2011 |

OTHER PUBLICATIONS

IBM et al, "Window Selection via Keyboards", IPCOM000056633D, Jan. 1, 1988, 2 pages.

*Primary Examiner* — Xiomara L Bautista
(74) *Attorney, Agent, or Firm* — Kristofer L. Haggerty (57) ABSTRACT

A computer detects user input within an input destination and determines whether the user input is continuous. If the user input is determined continuous, then the computer determines whether the input destination receiving the continuous user input has been changed during the receipt of the continuous user input. If the computer determines that the input destination has been changed during receipt of the continuous user input, the computer stores the portion of user input entered after the input destination had been changed in a temporary input buffer. The computer then presents the stored user input to a user and prompts a user selection of the appropriate input destination corresponding to the portion of stored user input.

15 Claims, 3 Drawing Sheets

(56) References Cited

U.S. PATENT DOCUMENTS

| | | | |
|---|---|---|---|
| 8,365,077 B2 * | 1/2013 | Sakakibara | H04N 1/00408 715/705 |
| 2007/0016876 A1 | 1/2007 | Schultz | |
| 2009/0199101 A1 * | 8/2009 | Cross, Jr. | 715/728 |
| 2010/0287498 A1 | 11/2010 | Palgon et al. | |
| 2015/0033168 A1 | 1/2015 | Bennah et al. | |

\* cited by examiner

IDENTIFYING INPUT INTERRUPTION

TECHNICAL FIELD

The present invention relates generally to user input, and more particularly to identifying unwanted user input interruptions.

BACKGROUND

Computers are used for many tasks today. Those tasks often require a user input, such as data entry or operational instructions, entered into a fields known as input destinations. In order to enter user input into one of said input destinations, a user must select the window containing the input destination as the focus, or foreground, window. Sometimes during user input into an input destination, however, focus is diverted from the input destination by, for example, accidentally selecting the desktop or a background window assuming the foreground focus. Situations where a background window assumes the focus, and user input, of an input destination include a background window prompting an error dialogue window, alerting a user that a process is complete, displaying the opening of a new application (or instance thereof), displaying the receipt of new data/information, or prompting required user input/output. When a new input destination assumes the focus of the original input destination, the current user input, whether it be clicking, typing, scrolling, etc., is entered into the new input destination rather than the original input destination, often causing an undesirable result.

SUMMARY

Embodiments of the present invention disclose a method, system, and computer program product for identifying input interruption. A computer detects user input within an input destination and determines whether the user input is continuous. If the user input is determined continuous, then the computer determines whether the input destination receiving the continuous user input has been changed during the receipt of the continuous user input. If the computer determines that the input destination has been changed during receipt of the continuous user input, the computer stores the portion of user input entered after the input destination had been changed in a temporary input buffer. The computer then presents the stored user input to a user and prompts a user selection of the appropriate input destination corresponding to the portion of stored user input.

DETAILED DESCRIPTION

Embodiments of the present invention will now be described in detail with reference to the accompanying figures.

Figure 1:
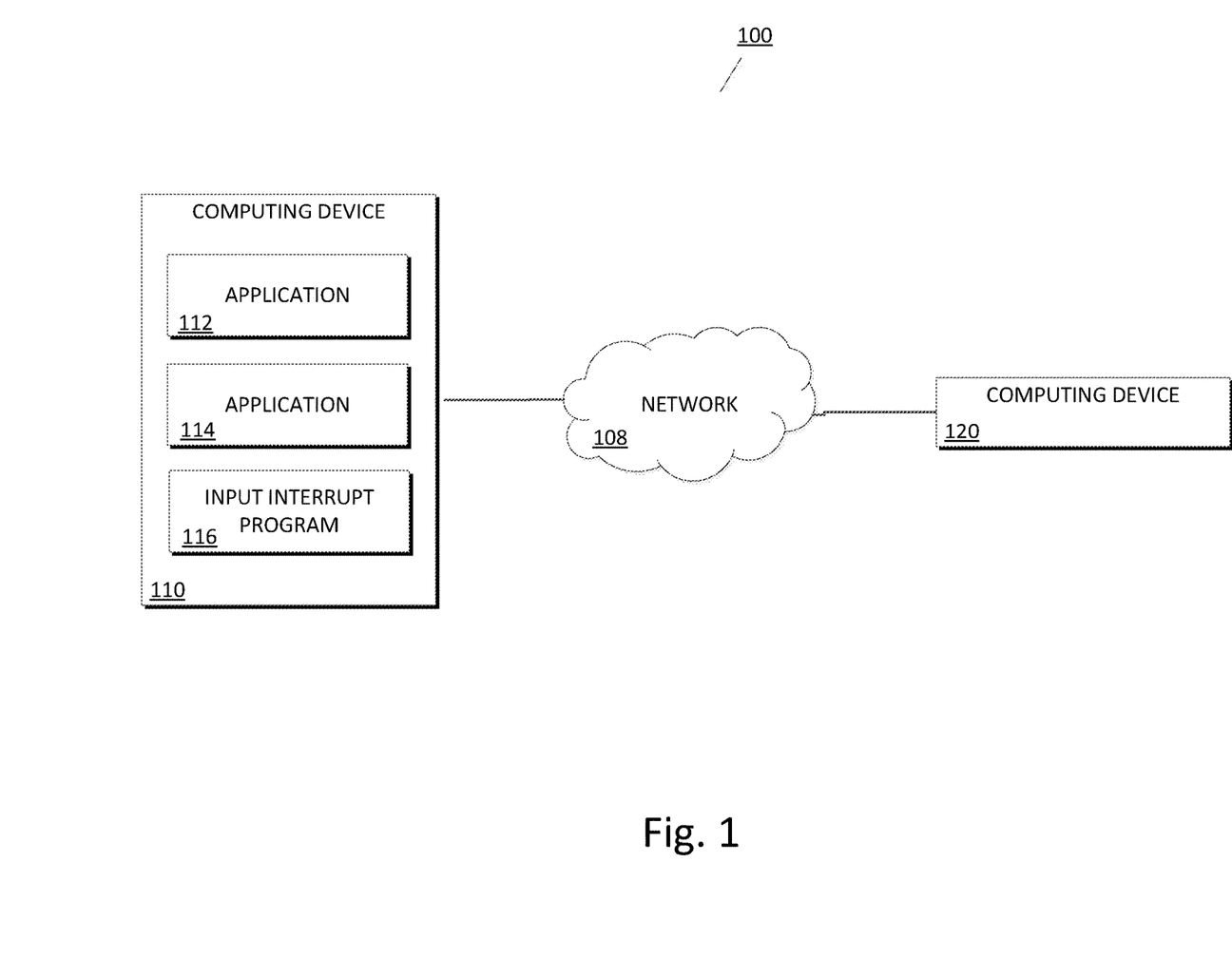
FIG. 1 illustrates input interruption system 100, in accordance with an embodiment of the invention.

FIG. 1 illustrates an input interrupt system 100, in accordance with an embodiment of the invention. In the example embodiment, input interrupt system 100 includes network 108, computing device 110, and computing device 120.

In the example embodiment, network 108 may be the Internet, representing a worldwide collection of networks and gateways to support communications between devices connected to the Internet. Network 108 may include, for example, wired, wireless or fiber optic connections. In other embodiments, network 108 may be implemented as an intranet, a local area network (LAN), or a wide area network (WAN). In general, network 108 can be any combination of connections and protocols that will support communications between computing device 110 and computing device 120.

In the example embodiment, computing device 120 may be a laptop computer, a notebook, tablet computer, netbook computer, personal computer (PC), a desktop computer, a personal digital assistant (PDA), a smart phone, a thin client, or any other electronic device or computing system capable of receiving and sending data to and from other computing devices. While computing device 120 is shown as a single device, in other embodiments, computing device 120 may be comprised of a cluster or plurality of computing devices, working together or working separately. Computing device 120 is described in more detail with reference to FIG. 3.

In the example embodiment, computing device 110 includes application 112 application 114, and input interrupt program 116. In the example embodiment, computing device 110 may be a laptop computer, a notebook, tablet computer, netbook computer, personal computer (PC), a desktop computer, a personal digital assistant (PDA), a smart phone, a thin client, or any other electronic device or computing system capable of receiving and sending data to and from other computing devices. While computing device 110 is shown as a single device, in other embodiments, computing device 110 may be comprised of a cluster or plurality of computing devices, working together or working separately. Computing device 110 is described in more detail with reference to FIG. 3.

In the example embodiment, application 112 is a program application on computing device 110 which is designed to perform a group of coordinated functions, tasks, or activities, such as a web browsing application or anti-virus application. In the example embodiment, application 112 operates in a window and contains one or more input destinations capable of receiving user input. Furthermore, multiple instances of application 112 may be opened in multiple windows, each containing one or more input destinations. In situations where multiple windows are open (corresponding to multiple applications or a single application), one window is considered the foreground, or active, window while any other open windows are considered background, or inactive, windows. Although inactive windows are still operational, the active window is the only window capable of receiving user input within corresponding input destination(s). Similarly, when multiple input destinations are present within an active window, the input destination receiving user input is considered the active input destination while others are considered inactive input destinations.

In the example embodiment, application 114 is a program application on computing device 110 which is designed to perform a group of coordinated functions, tasks, or activities, such as a web browsing application or anti-virus application. In the example embodiment, application 114 operates in a window and contains one or more input destinations capable of receiving user input. Furthermore, multiple instances of application 114 may be opened in multiple windows, each containing one or more input destinations. In situations where multiple windows are open (corresponding to multiple applications or a single application), one window is considered the foreground, or active, window while any other open windows are considered background, or inactive, windows. Although inactive windows are still operational, the active window is the only window capable of receiving user input within corresponding input destination(s). Similarly, when multiple input destinations are present within an active window, the input destination receiving user input is considered the active input destination while others are considered inactive input destinations.

Input interrupt program 116 is a computer program capable of detecting the receipt of a user input and determining whether the user input is continuous. Input interrupt program 116 is additionally capable of determining whether the original input destination receiving the continuous user input has been replaced by a new input destination and, if so, storing the remainder of the continuous user input into a temporary input buffer. Input interrupt program 116 is further capable of implementing the stored input into the original or new input destination based on a user selection.

Figure 2:
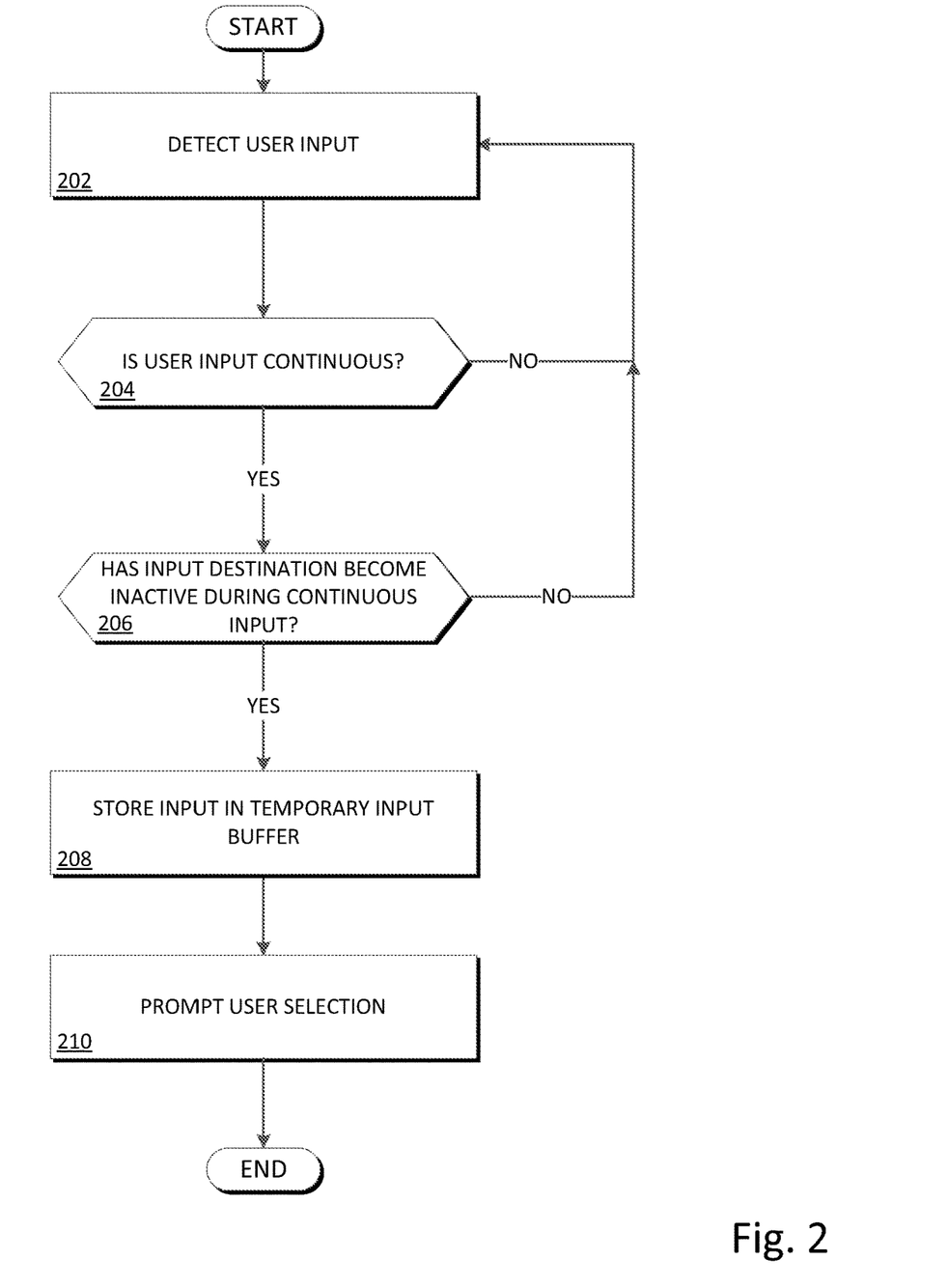
FIG. 2 is a flowchart illustrating the operations of input interrupt program 116 of FIG. 1 in identifying and resolving undesired user input entries that results from changing input destinations.

FIG. 2 is a flowchart depicting the operation of input interrupt program 116 in identifying and resolving undesired user input entries that result from unexpectedly changing input destinations.

Input interrupt program 116 detects the receipt of a user input within an input destination by communicating with the operating system of computing device 110. For example, input interrupt program 116 may detect the receipt of inputs such as mouse, microphone, touchscreen, keyboard, etc., and also inputs received from applications (such as popups or notifications) running on computing device 110 (step 202). Such user inputs include typing (or key events), clicking (click events), scrolling, highlighting, speaking, gesturing, touching the screen, and other forms of communication directing computing device 110. User inputs are entered within fields known as input destinations and one or more input destinations may be contained within the windows of application 112 and application 114. Input destinations are fields capable of receiving user input and include text fields, dropdown menus, dials, radial buttons, scales, calendars, and buttons/button bars. In the example embodiment, user input can only be entered into one input destination at a time and, therefore, a selected input destination is known as the active input destination while other input destinations are known as inactive input destinations. In the example embodiment, input interrupt program 116 establishes a first input destination as the input destination to first receive user input, such as a click event or key event. For example, if a user would like to search for apple pie recipes in a web browsing application, application 112, then the user selects a search bar input destination (making it active) within a window of the web browser and types "apple pie recipes". Following the user selection of the search bar, the search bar input destination is considered both active and the first input destination. Note, however, that while an alternative input destination may become the active input destination, the input destination corresponding to the search bar will remain the first input destination until input interrupt program 116 stops receiving continuous user input.

Input interrupt program 116 determines whether the user input is continuous by communicating with the operating system of computing device 110 (decision 204). In the example embodiment, if an input is continuous during a switch in input destinations, this may suggest that not only was the user interrupted, but also that the user did not intend to switch input destinations at that time and, thus, invoke remedial measures to match the appropriate input with the appropriate input destination. In the example embodiment, input interrupt program 116 determines whether input is continuous using a two-prong test, however, in other embodiments, determining whether an input is continuous may be performed alternatively. In the example embodiment, the first prong of the two-prong test determines whether events making up the user input (key events, click events, scroll events, etc.) occur within a specified time period of each other. Generally speaking, events in close temporal proximity to one another suggest that the user is mid-thought and input was intended to be uninterrupted. Furthermore, brief time periods between events is additionally indicative of a lack of opportunity to manually switch input destinations. While the time period may be configured by the user for each individual application and/or input destination, the default threshold time period between events is 500 milliseconds. Continuing the example above where the user is searching for apple pie recipes in the first (and active) input destination of application 112 (a web browser), if the time periods between the keystrokes of "apple pie recipes" range from 250 milliseconds to 400 milliseconds, then the user input passes the first prong of the continuousness test because the time periods between key events do not exceed 500 milliseconds. Conversely, temporal gaps between events suggest that the user may have paused and consciously contemplated switching input destinations before the input destination was changed. Additionally, pauses between events are indications that the user had the opportunity to manually switch input destinations. Continuing the example above, if the user typed the characters comprising the words "apple pie" with time periods of 250 milliseconds to 400 milliseconds between each character but pauses for 800 milliseconds between the characters in the word "recipes", then the input "apple pie" passes the first prong of the continuousness test while the input of "recipes" does not pass the first prong of the continuousness test.

Passing prong one of the two-prong test prompts the second prong of the two-prong test in which input interrupt program 116 communicates with the operating system of computing device 110 to determine whether the coordinate positions of a mouse pointer (or alternative inputs) are within a threshold distance of the coordinates of the first input destination. Generally speaking, greater proximity of the mouse pointer to the input destination coordinates suggest that the user had the intent to stay within the current input destination. Additionally, if the mouse pointer (or alternative inputs) never leaves the area of the input destination, it is unlikely that the user intended to switch to different input destination. While the threshold distance may be set by the user for each individual application and/or input destination, the default threshold distance is 200 coordinate units in any direction. Continuing the example above with the user searching for apple pie recipes in the first and active input destination of application 114, if the coordinates of the mouse location remain 150 coordinate units above the search bar during the user input, then the user input passes the second prong of the two prong test and the input is considered continuous. Conversely, lesser proximity between the coordinates of an input destination and the coordinates of the mouse pointer suggests that it may have been the intention of the user to exit the input destination. Continuing the example where a user is searching apple pie recipes in a first and active input destination application 112 window, if the mouse coordinates are 500 coordinate units to the right of the search bar, then the user input fails the second prong of the two-prong test because the coordinates of the mouse were more than 200 characters away from the coordinates of the search bar (first input destination). In further embodiments, the second prong of the two-prong test may be administered alternatively, such as determining whether the mouse (or alternative inputs) have moved a threshold distance during the receipt of the continuous user input. For example, if, during the receipt of continuous user input, the mouse pointer moves more than 300 coordinate units in any direction (regardless of input destination coordinate positions), then the user input fails the second prong of the two-prong test. While in the example embodiment the user input must pass both prongs of the two-prong test, in other embodiments, the user input may only have to pass a single prong of the two-prong test.

If input interrupt program 116 determines that the user input is not continuous (decision 204 "NO" branch), then input interrupt program 116 continues to detect user input within an active input destination (step 202).

If input interrupt program 116 determines that the user input is continuous (decision 204 "YES" branch), then input interrupt program 116 communicates with the operating system and program applications of computing device 110 to determine whether the first input destination has become inactive during the receipt of a continuous user input (decisions 206). In the example embodiment, an active input destination may be made inactive when a user accidentally clicks outside of the input destination/corresponding window or in situations where an inactive input destination/window requires user attention. Such situations where an inactive input destination/window require user attention include notification windows, such as prompting an error dialogue window, alerting the user that a process is complete, opening of new applications (or instances thereof), receipt of new data/information, or required user input/output (for example, overwrite duplicate file or save duplicate). Input interrupt program 116 determines whether the first input destination has become inactive by establishing a first input destination upon receipt of user input in step 202 and communicating with the operating system to determine whether the first input destination has become an inactive due to, for example, another window becoming the foreground (active) window. Continuing the example above, if a second input destination corresponding to application 114 becomes active while the user is entering a continuous input of "apple pie recipes" into the first input destination, then input interrupt program 116 determines that the first input destination has become inactive during the continuous input. Similarly, if, during the continuous entry of "apple pie recipes" into the first input destination, the user accidentally clicks the desktop, then input interrupt program 116 communicates with the operating system of computing device 110 to determine that the first input destination which was previously active has become inactive during a continuous user input.

If input interrupt program 116 determines that the active input destination has not become inactive during the continuous input (decision 206 "NO" branch), then input interrupt program 116 continues to detect user input within an active input destination (step 202).

If input interrupt program 116 determines that the first input destination has become inactive during receipt of a continuous input (decision 206 "YES" branch), then input interrupt program 116 stores the remainder of the user input following the first input destination becoming inactive in a temporary input buffer (step 208). In the example embodiment, the temporary input buffer stores the remainder of the user input (including key events, click events, etc.) after determining that the first input destination is no longer active. Furthermore, in the example embodiment, events stored in the temporary input buffer are not applied to the second (now active) input destination. Continuing the example above, if the user input (apple pie recipes) is considered continuous and the first input destination (corresponding to application 112) is replaced by a second input destination (corresponding to application 114 window) after the letter "r" in recipes is input to the first input destination, then "apple pie r" remains in the first input destination while input interrupt program stores "ecipes" in the temporary input buffer ("ecipes" is not entered into the second input destination). Similarly, if input interrupt program determines that click or scroll events are continuous during an input destination activity change, then input interrupt program 116 stores the click and scroll events following the first input destination becoming inactive in the temporary input buffer without applying them to the second input destination.

Input interrupt program 116 presents a user interface to the user prompting selection of the appropriate input destination for the input stored in the temporary input buffer (step 210). In the example embodiment, input interrupt program 116 displays the user input stored in the temporary input buffer as well as selectable options corresponding to the first input destination and the second input destination, if applicable. Continuing the example above where the first input destination is replaced (or made inactive) by the second input destination, if the temporary input buffer contains "ecipes", then input interrupt program 116 displays a user interface containing the user input "ecipes" and options to implement the input into the first input destination or second input destination.

Figure 3:
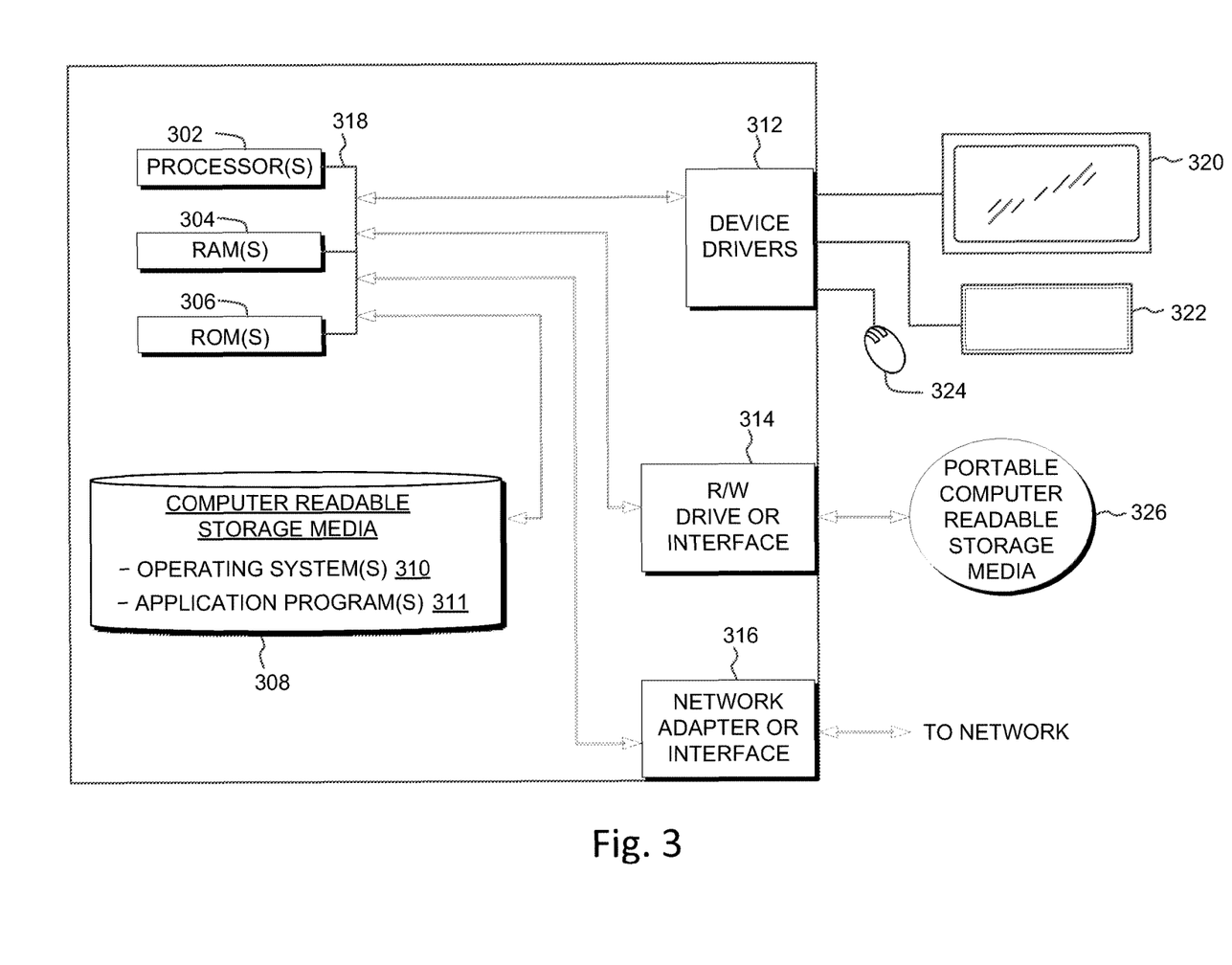
FIG. 3 is a block diagram depicting the hardware components of input interrupt system 100 of FIG. 1, in accordance with an embodiment of the invention.

FIG. 3 depicts a block diagram of components of computing device 110 of input interrupt system 100 of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 may include one or more processors 302, one or more computer-readable RAMs 304, one or more computer-readable ROMs 306, one or more computer readable storage media 308, device drivers 312, read/write drive or interface 314, network adapter or interface 316, all interconnected over a communications fabric 318. Communications fabric 318 may be implemented with any architecture designed for passing data and/or control information between processors (such as microprocessors, communications and network processors, etc.), system memory, peripheral devices, and any other hardware components within a system.

One or more operating systems 310, and one or more application programs 311, for example, input interrupt 116, are stored on one or more of the computer readable storage media 308 for execution by one or more of the processors 302 via one or more of the respective RAMs 304 (which typically include cache memory). In the illustrated embodiment, each of the computer readable storage media 308 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 314 to read from and write to one or more portable computer readable storage media 326. Application programs 311 on computing device 110 may be stored on one or more of the portable computer readable storage media 326, read via the respective R/W drive or interface 314 and loaded into the respective computer readable storage media 308.

Computing device 110 may also include a network adapter or interface 316, such as a TCP/IP adapter card or wireless communication adapter (such as a 4G wireless communication adapter using OFDMA technology). Application programs 311 on computing device 110 may be downloaded to the computing device from an external computer or external storage device via a network (for example, the Internet, a local area network or other wide area network or wireless network) and network adapter or interface 316. From the network adapter or interface 316, the programs may be loaded onto computer readable storage media 308. The network may comprise copper wires, optical fibers, wireless transmission, routers, firewalls, switches, gateway computers and/or edge servers.

Computing device 110 may also include a display screen 320, a keyboard or keypad 322, and a computer mouse or touchpad 324. Device drivers 312 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314 and network adapter or interface 316 may comprise hardware and software (stored on computer readable storage media 308 and/or ROM 306).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

Various embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for identifying input interruptions, the method comprising:
    determining, by a processor, whether a user input is continuous when entered into a first input destination, wherein determining whether the user input is continuous is based on comparing a time interval between one or more events comprising the user input to a threshold time interval;
    based on determining that the user input is continuous, determining, by the processor, whether a portion of the user input is entered into a second input destination during the continuous user input;
    based on determining that the portion of the user input is entered into the second input destination during the continuous user input, saving, by the processor, the portion of the user input in a computer-readable storage media; and
    displaying, by the processor, a selectable option on a display to apply the portion of the user input to at least one of the first input destination and the second input destination.

2. The method of claim 1, wherein determining whether the user input is continuous is further based on:
    determining, by the processor, one or more coordinate positions associated with the first input destination;
    determining, by the processor, one or more coordinate positions associated with a mouse pointer; and
    determining, by the processor, whether the one or more coordinate positions associated with the mouse pointer are within a threshold distance of the one or more coordinate positions associated with the first input destination.

3. The method of claim 1, wherein determining whether the user input is continuous is further based on:
    determining, by the processor, one or more coordinate positions associated with a mouse pointer prior to receipt of the user input;
    determining, by the processor, one or more coordinate positions associated with the mouse pointer after receipt of the user input; and
    determining, by the processor, whether the one or more coordinate positions associated with the mouse pointer prior to receipt of the user input are within a threshold distance of the one or more coordinate positions associated with the mouse pointer following receipt of the user input.

4. The method of claim 1, wherein the first input destination and the second input destination include at least one of: a text field, a dropdown menu, a dial, a radial button, a scale, and a button.

5. The method of claim 1, wherein the one or more events include at least one of: one or more key events, one or more click events, one or more scroll events, one or more gestures, and one or more screen touches.

6. A computer program product for identifying input interruption, the computer program product comprising:
    one or more computer-readable storage media and program instructions stored on the one or more computer-readable storage media, the program instructions comprising:
    program instructions to determine whether a user input is continuous when entered into a first input destination, wherein determining whether the user input is continuous is based on comparing a time interval between one or more events comprising the user input to a threshold time interval;
    based on determining that the user input is continuous, program instructions to determine whether a portion of the user input is entered into a second input destination during the continuous user input;
    based on determining that the portion of the user input is entered into the second input destination during the continuous user input, program instructions to save the portion of the user input in the one or more computer-readable storage media; and
    program instructions to display a selectable option on a display to apply the portion of the user input to at least one of the first input destination and the second input destination.

7. The computer program product of claim 6, wherein the program instructions to determine whether the user input is continuous is further based on:
    program instructions to determine one or more coordinate positions associated with the first input destination;
    program instructions to determine one or more coordinate positions associated with a mouse pointer; and
    program instructions to determine whether the one or more coordinate positions associated with the mouse pointer are within a threshold distance of the one or more coordinate positions associated with the first input destination.

8. The computer program product of claim 6, wherein the program instructions to determine whether the user input is continuous is further based on:

program instructions to determine one or more coordinate positions associated with a mouse pointer prior to receipt of the user input;

program instructions to determine one or more coordinate positions associated with the mouse pointer after receipt of the user input; and program instructions to determine whether the one or more coordinate positions associated with the mouse pointer prior to receipt of the user input are within a threshold distance of the one or more coordinate positions associated with the mouse pointer following receipt of the user input.

9. The computer program product of claim 6, wherein the first input destination and the second input destination include at least one of: a text field, a dropdown menu, a dial, a radial button, a scale, and a button.

10. The computer program product of claim 6, wherein the one or more events include at least one of: one or more key events, one or more click events, one or more scroll events, one or more gestures, and one or more screen touches.

11. A computer system for identifying input interruption, the computer system comprising:

one or more computer processors, one or more computer-readable storage media, and program instructions stored on one or more of the computer-readable storage media for execution by at least one of the one or more processors, the program instructions comprising:

program instructions to determine whether a user input is continuous when entered into a first input destination, wherein determining whether the user input is continuous is based on comparing a time interval between one or more events comprising the user input to a threshold time interval;

based on determining that the user input is continuous, program instructions to determine whether a portion of the user input is entered into a second input destination during the continuous user input;

based on determining that the portion of the user input is entered into the second input destination during the continuous user input, program instructions to save the portion of the user input in the one or more computer-readable storage media; and program instructions to display a selectable option on a display to apply the portion of the user input to at least one of the first input destination and the second input destination.

12. The computer system of claim 11, wherein the program instructions to determine whether the user input is continuous is further based on:

program instructions to determine one or more coordinate positions associated with the first input destination;

program instructions to determine one or more coordinate positions associated with a mouse pointer; and program instructions to determine whether the one or more coordinate positions associated with the mouse pointer are within a threshold distance of the one or more coordinate positions associated with the first input destination.

13. The computer system of claim 11, wherein the program instructions to determine whether the user input is continuous is further based on:

program instructions to determine one or more coordinate positions associated with a mouse pointer prior to receipt of the user input;

program instructions to determine one or more coordinate positions associated with the mouse pointer after receipt of the user input; and program instructions to determine whether the one or more coordinate positions associated with the mouse pointer prior to receipt of the user input are within a threshold distance of the one or more coordinate positions associated with the mouse pointer following receipt of the user input.

14. The computer system of claim 11, wherein the first input destination and the second input destination include at least one of: a text field, a dropdown menu, a dial, a radial button, a scale, and a button.

15. The computer system of claim 11, wherein the one or more events include at least one of: one or more key events, one or more click events, one or more scroll events, one or more gestures, and one or more screen touches.

* * * * *